United States Patent
Eggert, Jr.

[15] 3,693,204
[45] Sept. 26, 1972

[54] CLOSURE APPARATUS

[72] Inventor: Walter S. Eggert, Jr., Huntingdon Valley, Pa.

[73] Assignee: Boothe Airside Services Inc.

[22] Filed: Sept. 24, 1970

[21] Appl. No.: 75,035

[52] U.S. Cl. ................................................14/71
[51] Int. Cl. ..........................................B65g 11/00
[58] Field of Search ...............................14/71, 72

[56] References Cited

UNITED STATES PATENTS

| | | | |
|---|---|---|---|
| 3,110,048 | 11/1963 | Bolton | 14/71 |
| 3,310,823 | 3/1967 | Preiss | 14/71 |
| 3,121,243 | 2/1964 | Phillips | 14/71 |
| 3,317,942 | 5/1967 | Wollard | 14/71 |

*Primary Examiner*—Jacob L. Nackenoff
*Attorney*—Harold T. Stowell, Harold L. Stowell, Albert Tockman and Thomas J. Greer, Jr.

[57] ABSTRACT

Closure apparatus for a walkway which closes the small gap remaining after the walkway has been aligned with a doorway opening in a structure such as a parked aircraft. The apparatus includes an inclinable threshold ramp which will follow lateral excursions of the airplane with a constant force contact. The threshold ramp includes apparatus which cooperates with the parked aircraft door to release the threshold to enable it to go to its lowest position in case of a sudden lowering of the position of the aircraft.

9 Claims, 8 Drawing Figures

INVENTOR.
Walter S. Eggert, Jr.
BY
William R. Nolte
AGENT

CLOSURE APPARATUS

This invention relates to a closure apparatus for a loading bridge or walkway to accommodate the loading and unloading of passengers between an airport terminal building and a vehicle such as a parked aircraft, and more particularly to a closure apparatus with improved contacting interface capabilities between the parked aircraft and passenger walkway structures.

The closure apparatus of the present invention has utility in the passenger bridge loading devices of the type shown and described in U.S. Pat. No. 3,404,417 entitled "Conveyance Loading Apparatus" to J.C. Wollard et al. The above patent illustrates a power driven ramp walkway structure pivotally mounted on one end of a pedestal adjacent a terminal building, and having suitable power means to cause the bridge walkway sections to be positioned relative to one another in a telescoping fashion to substantially close the gap between the building and a parked aircraft. A rotatable vestibule having a pivotal hood at the end of the walkway is then aligned with the doorway opening in the aircraft and subsequently moved until it makes contact with the sides of the aircraft. Frequently such movements are accomplished in a careless manner. Due to the rigid floor construction of the vestibule and the fact that the floor is frequently brought into hard contact with the aircraft, the fuselage skin surfaces of the aircraft are often damaged. Moreover, in other instances, wind loads striking the sides of the aircraft impart lateral in-out movements to the parked aircraft thereby causing impacts with the hard floor structure of the vestibule. This is especially noticeable with some of the newer and larger aircraft which have vertical tail fins or stabilizers which extend upwardly three stories high. The vertical stabilizers operate as large sails which catch the wind and impart lateral movements to the aircraft. Due to the rigid nature of the prior art walkway structures the lateral thumping of the fuselage against the hard rigid walkway structure has resulted in serious damage to such aircraft.

Still another problem inherent in such constructions is that when the loading bridge is in position to receive passengers, the door of the aircraft is swung open and is wholly received within the interior of the vestibule of the loading bridge. In the event that the aircraft should suddenly lose its vertical elevation due to failure of its tires or suspension system, the door which has been so opened would strike the hard floor of the vestibule with a resulting damage to the same and the aircraft.

It is accordingly the principal object of this invention to provide a novel closure apparatus for a walkway for mating engagement with a parked aircraft.

It is still another object of this invention to provide an improved closure apparatus for a walkway for mating engagement with an aircraft which apparatus includes a pivotal threshold ramp and control apparatus engageable with an aircraft door to enable lowering of said threshold ramp in case of a power failure or sudden lowering of the position of the aircraft.

It is still another object of this invention to provide an improved closure apparatus, for a terminal building which is extendable horizontally from the building and which includes tiltable ramp means to enable transfer of passengers from aircraft of different sizes which have floor elevations of different heights above the ground level.

In accordance with the present invention a closure apparatus for loading and unloading passengers is provided which is carried by a loading bridge or fixed building structure. The closure apparatus is forwardly extendable to make contact with a parked aircraft. The apparatus includes tracked carriage frame means mounted for forward and aft movement relative to said structure. The carriage frame means support canopy means, the latter being mounted thereon for movement between retracted and extended positions relative to the parked aircraft. The carriage frame means in addition includes tiltable ramp means pivotally mounted thereto to enable its forward end portion to match the elevation of the threshold of the aircraft. Drive means having clutch means are provided for moving said ramp means into a desired elevation. Additional means associated with said ramp means and responsive to pressure engagement with a door of an aircraft folded within the canopy apparatus are provided to disengage said clutch means to enable downward movement of said ramp frame means.

For a better understanding of the present invention, together with other and further objects thereof, reference is had to the following description taken in connection with the accompanying drawings. In the drawings, FIG. 1 is a three-quarter front elevational view, partially in section showing the closure apparatus of the present invention rigidly affixed to a vestibule of an airline terminal building;

Figure 1:
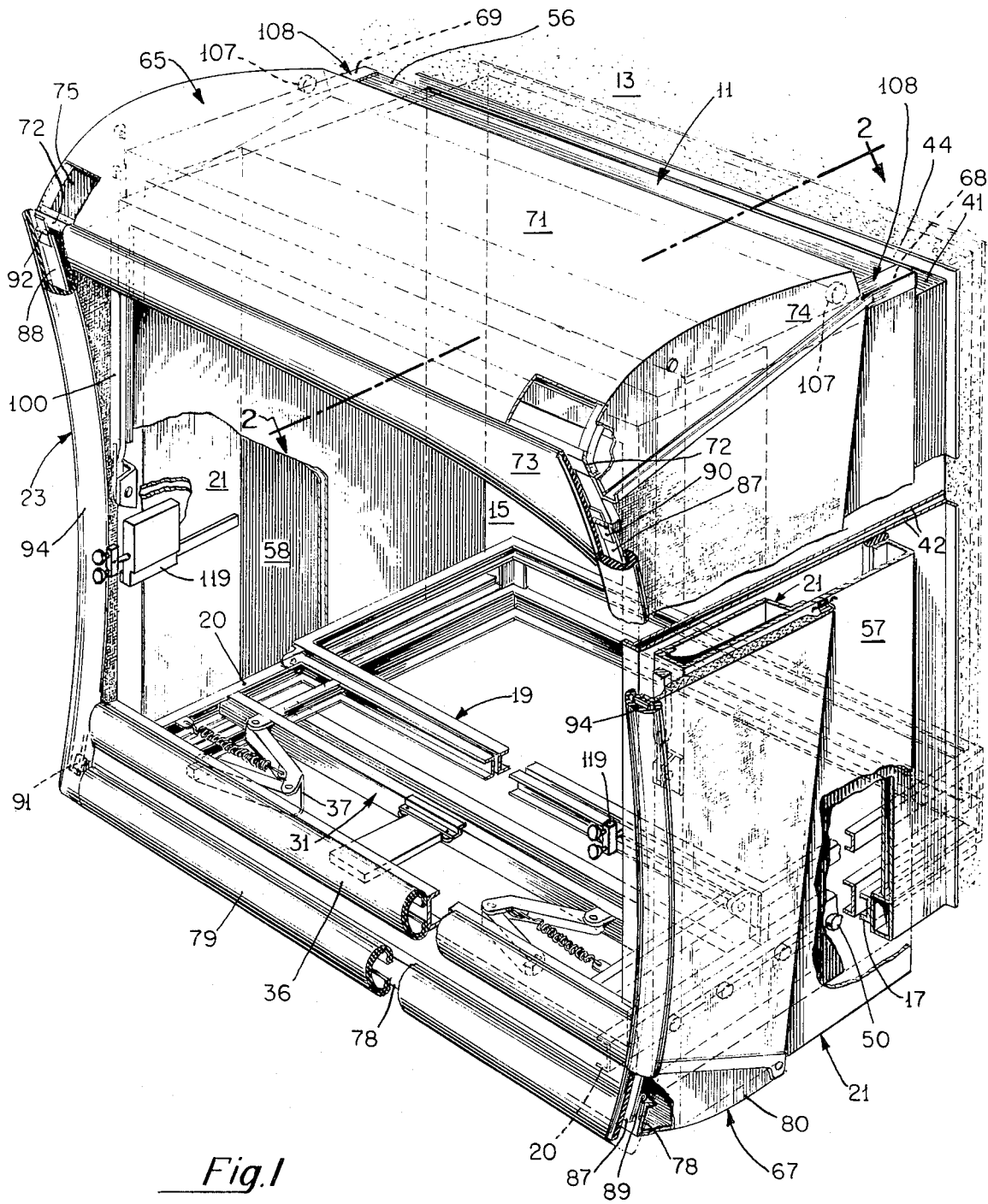

Referring to FIG. 1 of the drawings there is shown a preferred embodiment of the novel closure apparatus of the present invention. The apparatus includes a rectangular attachment frame 11 which is rigidly affixed to the vestibule 15 of a passenger loading bridge structure 13. The lower portion of the attachment frame includes opposed spaced apart track members 17 which receive and support carriage means 19 for extendable and retractable movement relative to the vestibule. The forward lower portion 20 of the carriage means has fixedly mounted thereon an encircling rectangular frame 21 which serves to support canopy means 23 for extendable and retractable movement relative to the carriage frame. The latter canopy means 23 in turn encircles rectangular frame 21 and is provided with drive means 25 which urge the canopy forwardly to seek an extended position. Restraining means 27, FIG. 2, under control of motor drive means 29 may be reversibly operated first in one direction and then in another to either enable extension or retraction of the canopy means 23. The forward portion of the aforementioned carriage frame means 19 includes ramp means 31 which can be tiltably driven up or down by drive means 33, FIG. 5, the left motor 127 of FIG. 4 to follow the up and down excursions of the aircraft P. The pivotal ramp means includes a main body portion 34 and forward ramp frame means 35, the latter being in the form of a channel member and having suitable resilient bumper material 36 on its leading edge. Link means 37, FIG. 4, extending between the body portion 34 and the forward ramp frame means 35 mount the latter to the former for extensible and retractible movement. Resilient drive means 39 suitably connected to link means 37 normally urge the forward frame means 37 to an extended position against the action of the aforementioned restraining means 27 attached to the previously mentioned canopy means 23.

Referring now to FIG. 1, 2, 3 and 6, the aforementioned attachment frame 11 includes a top wall 41 and opposite walls 42, 43 each of double panel construction and having flanged portions 44 which enable it to be mounted as with bolts or otherwise to the face and around the margins of a doorway opening 45 of terminal building 13. The bottom edges of the sidewalls 42, 43 are maintained in spaced relationship by means of a bridging channel member 46. The pair of channel track members 17 are secured along the inside faces of the bottom edges of the sidewall panels 42, 43. The channel members are positioned with respect to each other in a manner to receive rollers 50 disposed along opposite lower edges of the aforementioned carriage frame 19. The carriage frame is of two tier construction having a lower frame portion 51 and an upper floor portion 52. The floor portion 52 is shorter in length and is diaposed above the rear portion of the lower frame 51 to accommodate the previously referred to pivotal ramp means 31. The forward portion 20 of the lower frame 51 has secured thereto by means of spacer member 54 the aforementioned rectangular frame 21. Frame 21 includes a top portion 56, sides 57, 58 and bottom 59. Flanges 61 contiguous with and extending inwardly from the top and sides of the frame carry a weather seal strip 63 to contact the top 41 and sides 42, 43 of the attachment frame 11 during sliding movement therebetween. The forward portion of the frame is heavily reinforced, being of tubular construction, to provide support for the aforementioned canopy means 23.

The canopy means 23 consist of upper canopy means 65, side curtain means 66 and lower canopy means 67. The upper canopy means 65 is generally hood shaped, being of inverted trough shape and extending across the full width of the vestibule to rest on the tops 68, 69 of the sidewalls 57, 58 respectively of the supporting frame. The trough includes a curved central portion 71, terminating in a forward downturned reinforcing member 72 which carries a horizontally disposed contact pad 73 and which makes contact with the upper marginal surface of the doorway opening of the aircraft. The trough also includes opposed sidewalls 74, 75 which depend downwardly from the curved top portion. Reinforcing ribs 76 are spaced across the through and disposed in fore and aft relation to provide stiffness to the trough.

Figure 2:
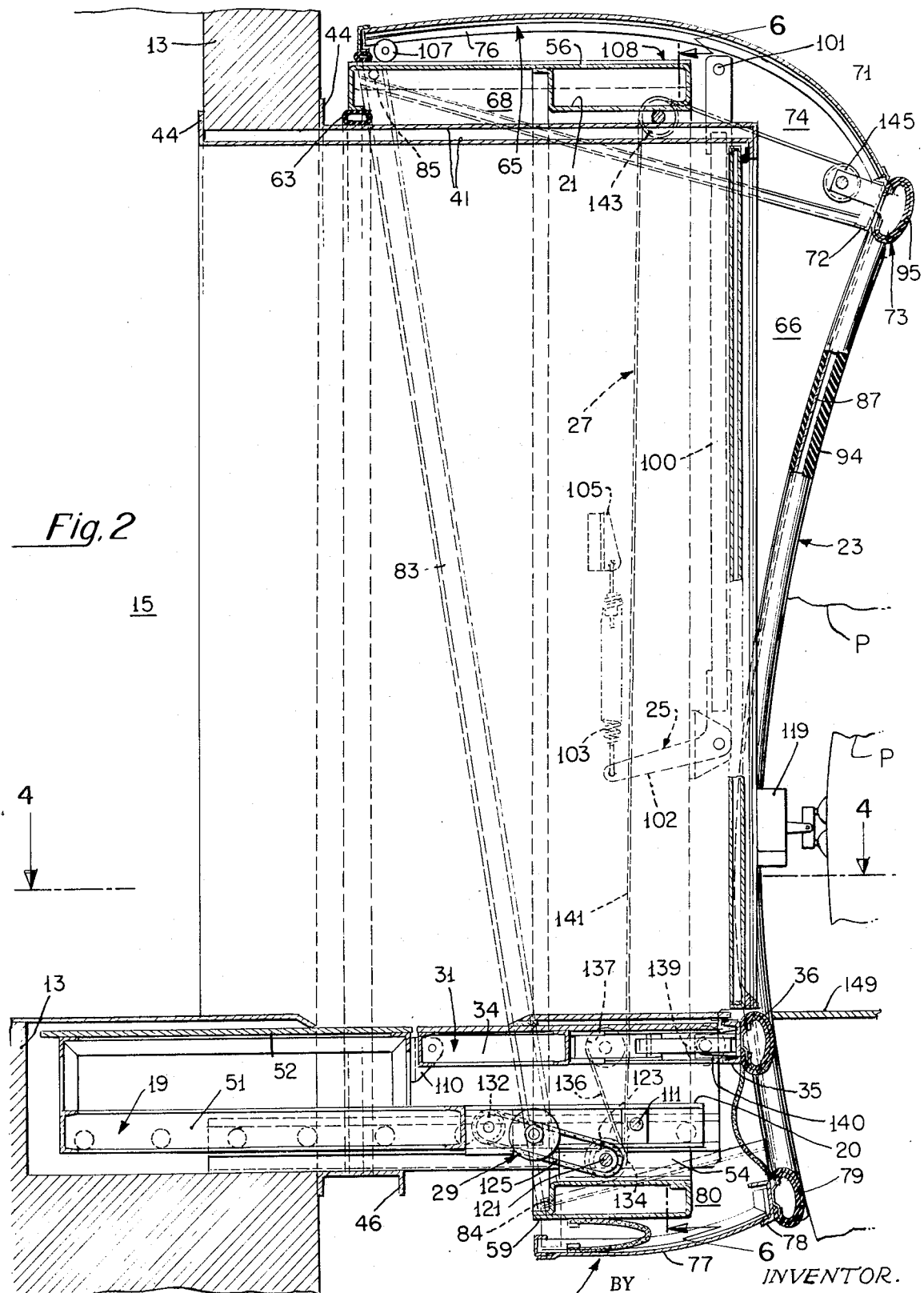
FIG. 2 is a sectional view taken along the lines 2—2 of FIG. 1 showing the closure apparatus in its retracted position.

The lower canopy means 67 is of generally similar construction as the upper trough means and is disposed in upright relationship. The lower canopy means include a central curved bottom sheet member 77 which is secured at its forward edge to a forward upright channel member 78. A resilient contact pad 79 is secured to the front face of the channel member 78. The canopy means further includes opposite upstanding sidewall members 80. Hanger members 83, FIG. 2, are pivotally connected at their lower ends to the rear portions of the side member 80 of the lower trough as at 84. The hanger members extend upwardly and rearwardly as seen in FIG. 2 and their upper ends are connected by means of a pivotal connection as at 85 to the rear end portions of the downwardly depending side members 74 of the upper trough members. A pair of vertical band or hanger strap members 87, 88 are attached at opposite ends of the upper and lower canopy members, see FIG. 1. The right strap 87 of the pair of straps is hinged as at 89 to the front of channel 78 of the lower canopy 67 and above to the right end portion of the front wall 72 of upper canopy 65 by means of hinge 90. The left hand strap member 88 is fastened top and bottom by means of hinge connections as at 91, 92 to the front wall 78 of the lower canopy member 67 and the front wall 72 of upper canopy 65. The pair of vertical straps 87, 88 include contact pad material 94 wrapped therearound, see FIG. 4, which cushion the contact of the canopy with the skin surface of the parked aircraft P. The side curtain members 66 are secured at their upper edges to the sidewalls 74, 75 of the upper canopy 65 and to the upwardly projecting sidewall 80 of the lower canopy 67. The forward edges of the side curtain members are also secured to the rear edge portions of the front hanger straps 87, 88, see FIG. 4.

Figure 3:
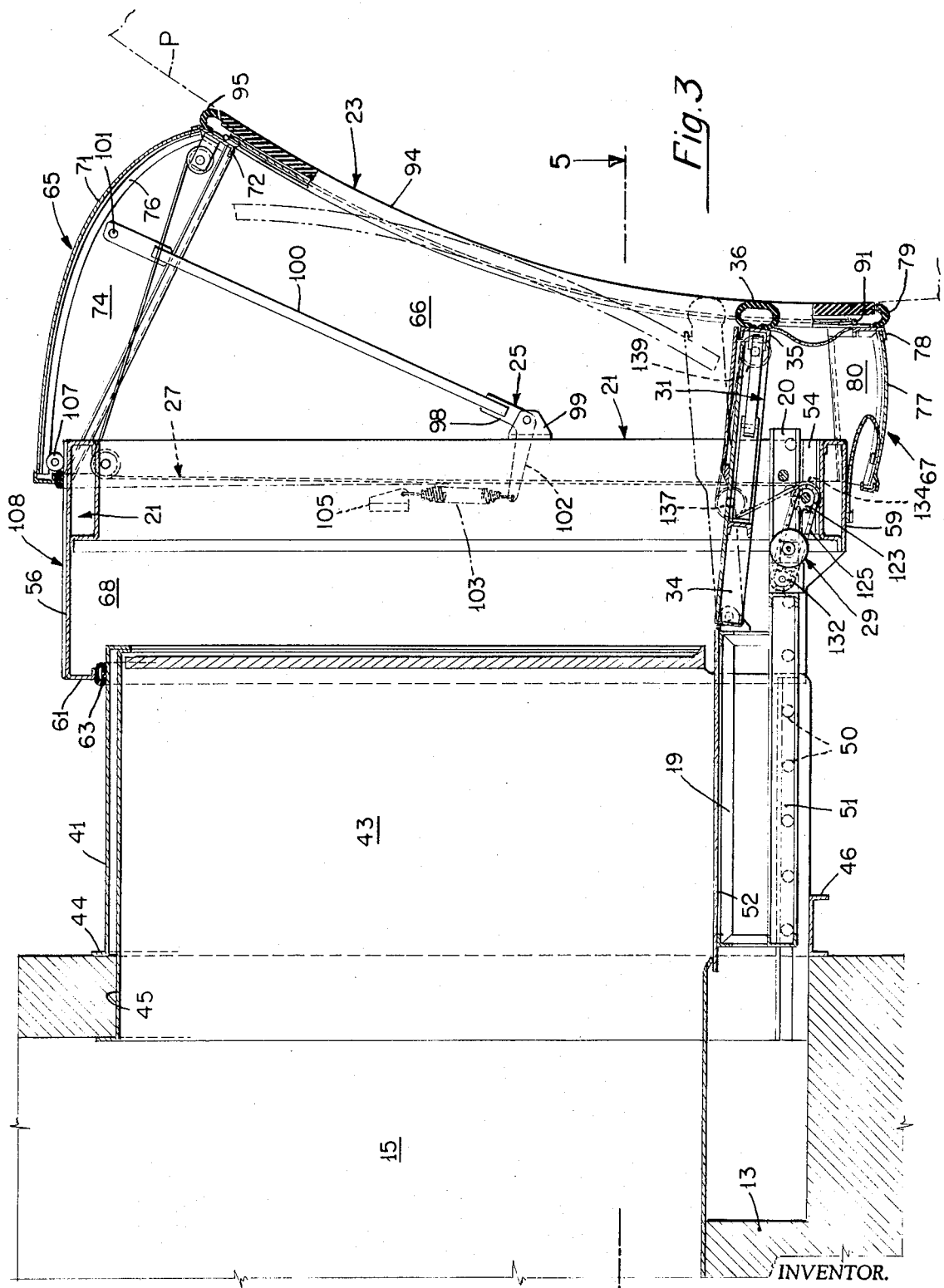
FIG. 3 is a view similar to FIG. 2 but showing the closure apparatus in its extended position.

With reference now to FIG. 2 and FIG. 3 the canopy means 23 may be extended forwardly from its retracted position shown in FIG. 2 to its extended position shown in FIG. 3. For this purpose the previously mentioned drive means 25 provide partial vertical support for the front portion of the canopy means to enable in-out excursions of the canopy means. The drive means include a bellcrank 98 which is pivotally mounted by a bracket 99 to the front wall of the frame 21. The vertical arm of the bellcrank includes a rod 100 affixed thereto and which extends upwardly and its extremity is pivotally connected to the sidewall 74 of the upper canopy as at pivot 101. The horizontal arm 102 of the bellcrank extends rearwardly and is connected at its extremity to one end of a spring 103. The upper end of the spring is anchored to supporting frame 21 by bracket 105. The rear portion of upper canopy 65 includes roller means 107 which ride on track 108, in the present instance. The cam element constitutes a straight surface of angle member resting on the tops of the sidewalls 57, 58 of the vestibule structure. The cam member 108 supports the rear portion of the top canopy member and coupled with rod 100 enables programmed forwardly and downwardly movement of the upper canopy 65 upon clockwise movement of the bellcrank means 25. While the cam surface is illustrated as a straight planar surface it is apparent that the cam means could be formed with curved surfaces or other configurations to vary the locus of movement of the upper canopy in its in-out excursions.

Figure 4:
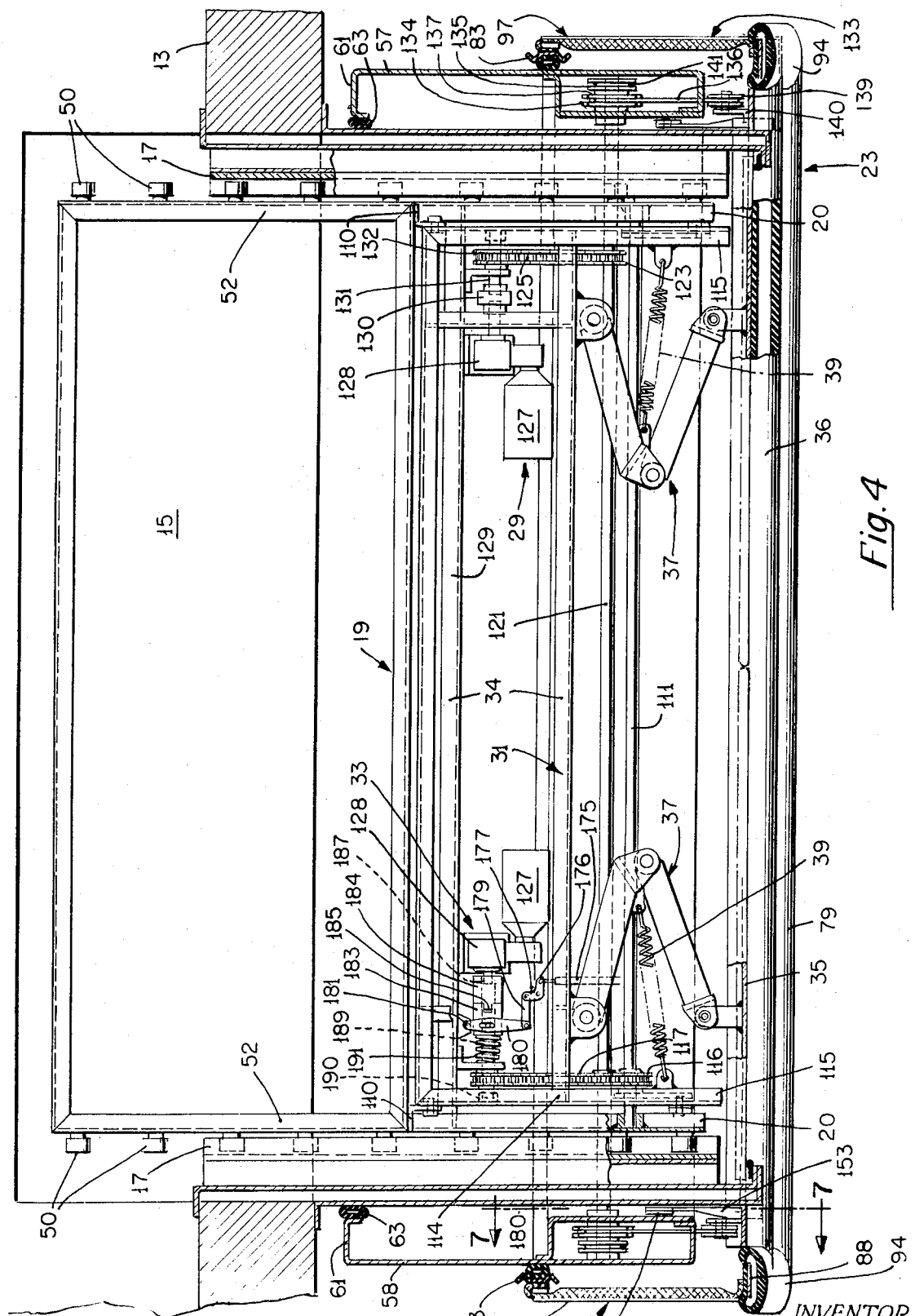
FIG. 4 is a sectional view taken along the lines 4—4 of FIG. 2 and showing underframe portions of the apparatus in their retracted positions.
Figure 7:
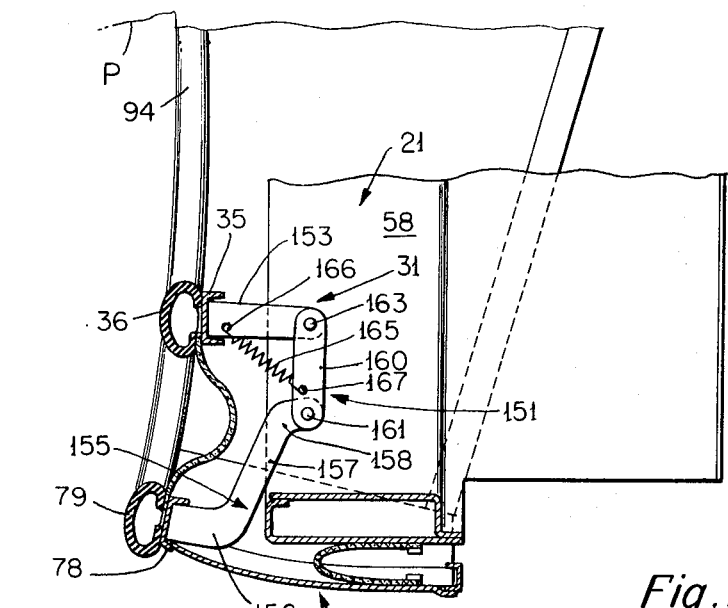
FIG. 7 is a sectional view taken along the lines 7—7 of FIG. 4 and showing a linkage for elevating the front portion of the lower canopy means.
Figure 8:
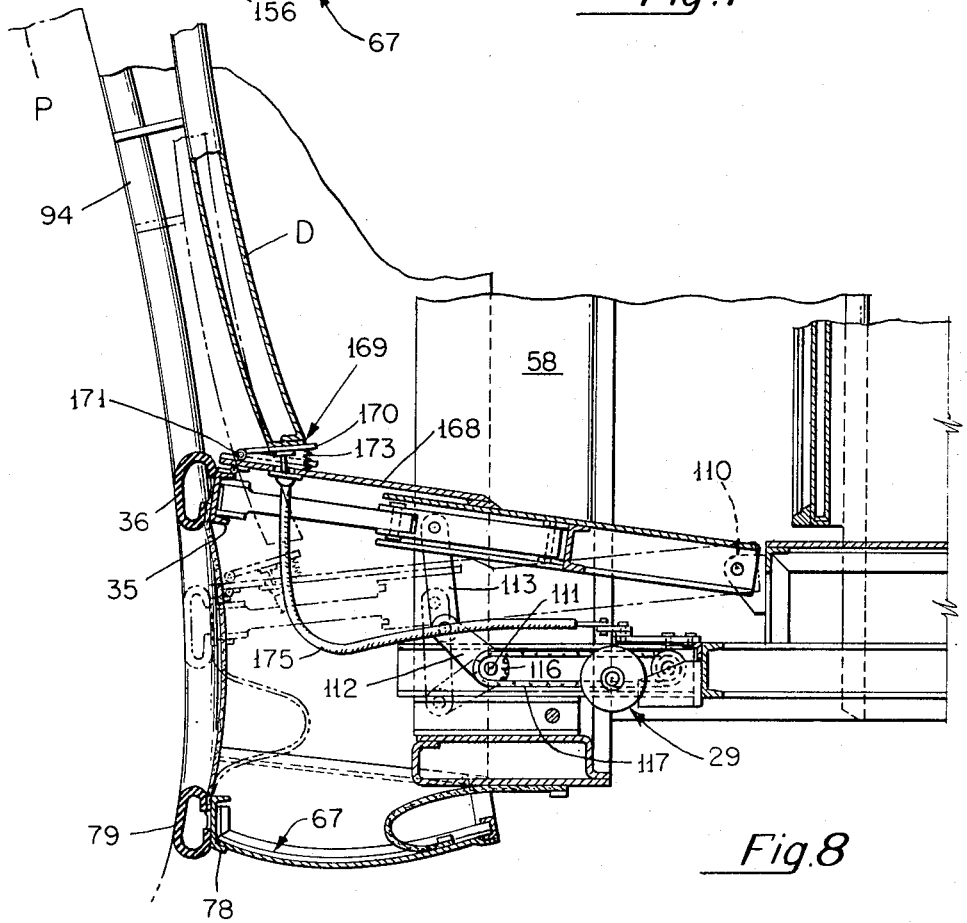
FIG. 8 is a sectional view taken along the lines 8—8 of FIG. 5 showing a door of a parked aircraft extending within the canopy apparatus and overhanging the tiltable ramp.

With reference now to FIGS. 4, 2 and 7, the pivotal ramp means 31, previously referred to is hinged by means of ears 110 to the forward face of the upper floor frame 52. The drive means for elevating and lowering the ramp means 31 includes a shaft 111 extending between and journalled for rotation between the opposite side forward portions 20 of carriage frame 19. The outer end portions of the shaft 111, see FIG. 8, include arms 112 affixed thereto. Links 115 are pivotally connected at their lower ends to the extremities of the affixed arms 113, and at their upper ends to forward end portions 115 of the side rails 114 of the pivotal ramp 31 to either raise or lower the forward end of the ramp. The shaft 111 has a sprocket 116 affixed thereon which is driven by chain belt 117. A combination brake and motor unit 127 (left in FIG. 4) mounted on the front portion of floor frame 51 through gear unit 128, and dog clutch 183, 184, 185 drives chain belt 117 through a toothed drive pulley 127. Depending upon the direction of current input to the motor 127, the ramp may be tilted up or down corresponding to the up and down phantom line position of tiltable ramp as seen in FIG. 8. The up and down phantom line positions of the ramp in turn correspond to different floor-threshold levels of the parked aircraft. As seen in FIGS. 1 and 2 the canopy apparatus of the present invention includes leveller sensing apparatus 119. Upon the leveller device sensing changes in elevation of the parked aircraft, appropriate input signals are generated by the device and conveyed to the motor M to either elevate or lower the outer end of ramp 31 to conform to the elevation of the threshold of the parked aircraft.

Still referring to FIGS. 4, 2 and 1 the drive means 29 for the restraining means 27 likewise includes a transverse shaft 121 journalled for rotation between the frame members 20 of the carriage means 19. A sprocket 123 is affixed to the shaft 121 and is driven by drive chain 125 which receives its power from drive means 29. The latter drive means includes a second motor 127 with a second gear unit 128 suitably mounted to a transverse lower frame member 129 of the carriage means 19. The gear unit in turn through clutch 130 drives stub shaft 131 which carries drive sprocket 132. The sprocket 132 meshes with drive chain 125 to rotate the same and to impart rotation to shaft 121. A double pulley unit 133 is affixed to each of the opposite ends of shaft 121. As seen in FIGS. 4 and 2 the inner sheave 134 carries a cable 136 which as seen in FIG. 2 extends upwardly to an idler pulley 137 and thence horizontally to a slack take-up pulley 139 which is affixed to forward transverse frame means 35 by means of bracket 140, see FIG. 5. In a similar manner the outer sheave 135 affixed to the shaft 121 has a cable 141 affixed thereto which extends upwardly through the forward tubular portion of sidewall 57 (FIG. 4) to engage idler pulley 143 mounted for rotation at the top portion of the sidewall and thence forwardly and downwardly to slack-take-up pulley 145 suitably secured to the forward end wall portion 74. Actuation of the right motor 127 of FIG. 4 in one direction will through aforedescribed drive chain rotate shaft 121 to pay out cables 136 and 141. By increasing the slack in cable 136 spring 39 is enabled to operate the link means 37 to cause forward movement of the forward frame means 35. Simultaneously with such increase in slack as a result of rotating shaft 121, cable means 141 is likewise payed out from its sheave 141. The slack so provided, see FIGS. 2 and 3, enables the canopy means 23 to be urged forwardly from its retracted position shown in FIG. 2 to its extended position as shown in FIG. 3. This follows since the bellcrank means 102 is rotated in a clockwise direction by means of the tension spring 103 coacting with horizontal arm 102 of said bellcrank. The rod 100 affixed to the vertical arm of the bellcrank supports the upper forward portion of the canopy member 71 and causes the same to be moved forwardly and downwardly as the rear portion of the canopy with roller 107 rides cam member 56. Since the lower canopy member 67 is suspended by front hanger straps 87, 88 FIG. 1 and, FIG. 4, and by rear hangers 83 it is likewise moved forwardly by said suspending members. The top and bottom canopy members 65, 67 respectively are thus moved forwardly in unison until the same make contact with the outer skin surfaces of the parked aircraft P. The front strap members 87, 88 with their encircling pad material 89 are thus wrapped around and conformed to the curved skin surface of the parked aircraft P. With the canopy means so in contact with the parked aircraft, the pivotal ramp means 31 may thus be elevated or lowered to match the level of floor 149 of the parked aircraft P in the manner as previously described.

With reference now to FIG. 7, in order to achieve better mating conformity of the front contact pad 79 affixed to the channel 78 forming the front wall of the lower canopy 67 with the fuselage skin surface of the parked aircraft P, link means 151 are provided between transverse channel member 35 of the tiltable ramp 31 and the channel member 78 constituting the front wall of lower canopy 67. The link means include a horizontally disposed arm 153 which is rigidly affixed to the rear web surface of channel member 35. A second arm 155 having a lower horizontal portion 156 is affixed to the inside web surface of channel 78. Extending generally vertically and upwardly from the lower arm portion 156 is an intermediate portion 157 which terminates in a horizontal stub portion 158. A vertical link 160 is pin connected at its lower end as at 161, and at its upper end as at pivot 163 to the rear extremity of the horizontally disposed arm 153. A tension spring 165 is diagonally disposed between the forward portion of arm 153 being connected thereto as at 166 and to the lower portion of vertical link 160 as at 167. The force inherent in the tension spring 165 tends to move the lower canopy 67 a slight amount forwardly as indicated by the dotted line position of the forward portion of lower trough means 67.

With reference now to FIG. 8, the same shows an arrangement in which the canopy apparatus 23 is in mating engagement with a parked aircraft P. As illustrated the door D of the aircraft is folded within the forward confines of the canopy apparatus. In the event of a power failure or a sudden lowering of the position of the aircraft such that the aircraft door would rest on the floor 168 of the ramp 31 fail-safe means 169 are provided on said ramp means to release the ramp drive means 33 which will allow the ramp to pivot to its lowest position. For this purpose the fail-safe means includes a treadle plate 170 hinged at its forward end as at 171 to the top surface of the floor 168. Spring means 173 interposed between the rear end of the treadle plate and the floor normally keep the rear end of the plate in an elevated position. A push-pull cable 175 extends upwardly at one of its ends through the floor and is secured at its ends to the underside of treadle plate 169. The opposite end of the push-pull cable 175, see FIG. 4, is connected to the extremity of arm 177 of bellcrank 176. The bellcrank may be suitably mounted for rotation to lower frame 20. The other arm of the bellcrank is connected by link 179 to lever 180 which is pivoted at its opposite end as at 181. Intermediate its length the lever is connected to dog 183 which in turn engages teeth 185 of sleeve 184 to thus define a clutch. As seen in FIG. 4, the drive shaft 187 of the left gearing 128 has toothed sleeve 184 thereon and constitutes part of the clutch. A driven shaft 189 aligned with the shaft 187 is journalled for rotation at one of its ends as at 190, while its opposite end is supported for rotation within an end of sleeve 184 which projects beyond shaft 187 a sufficient distance to accept the end of driven shaft 189. A spring 191 encircles driver shaft and urges dog 183, which is mounted for sliding movement on the shaft into engagement with the teeth 185 formed in the end of the sleeve 184. The toothed dog is movable axially on the shaft but is fixed against rotation about the shaft.

Figure 5:
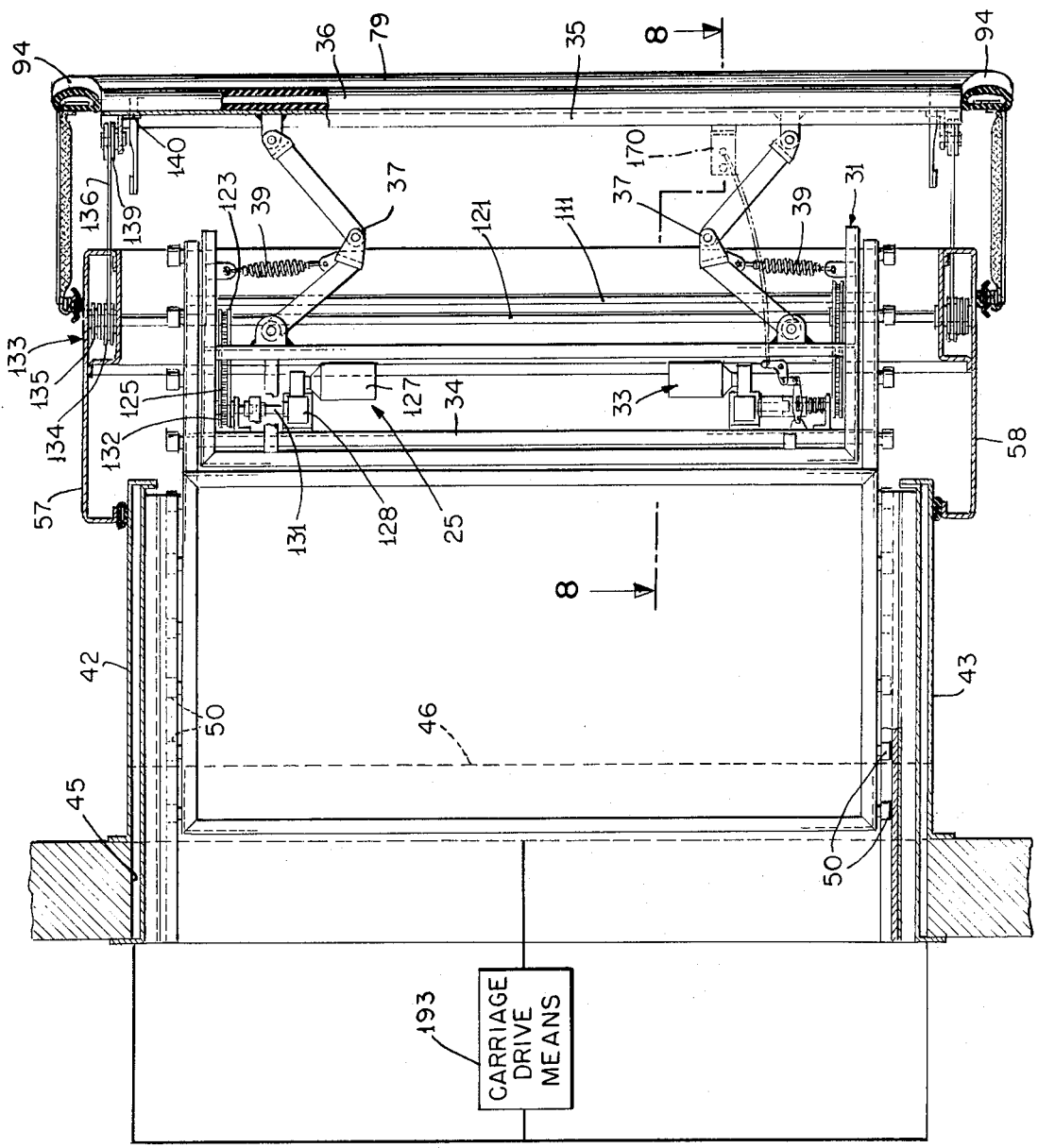
FIG. 5 is a sectional view taken along the lines 5—5 of FIG. 3 and showing underframe portions of the apparatus in their extended positions.
Figure 6:
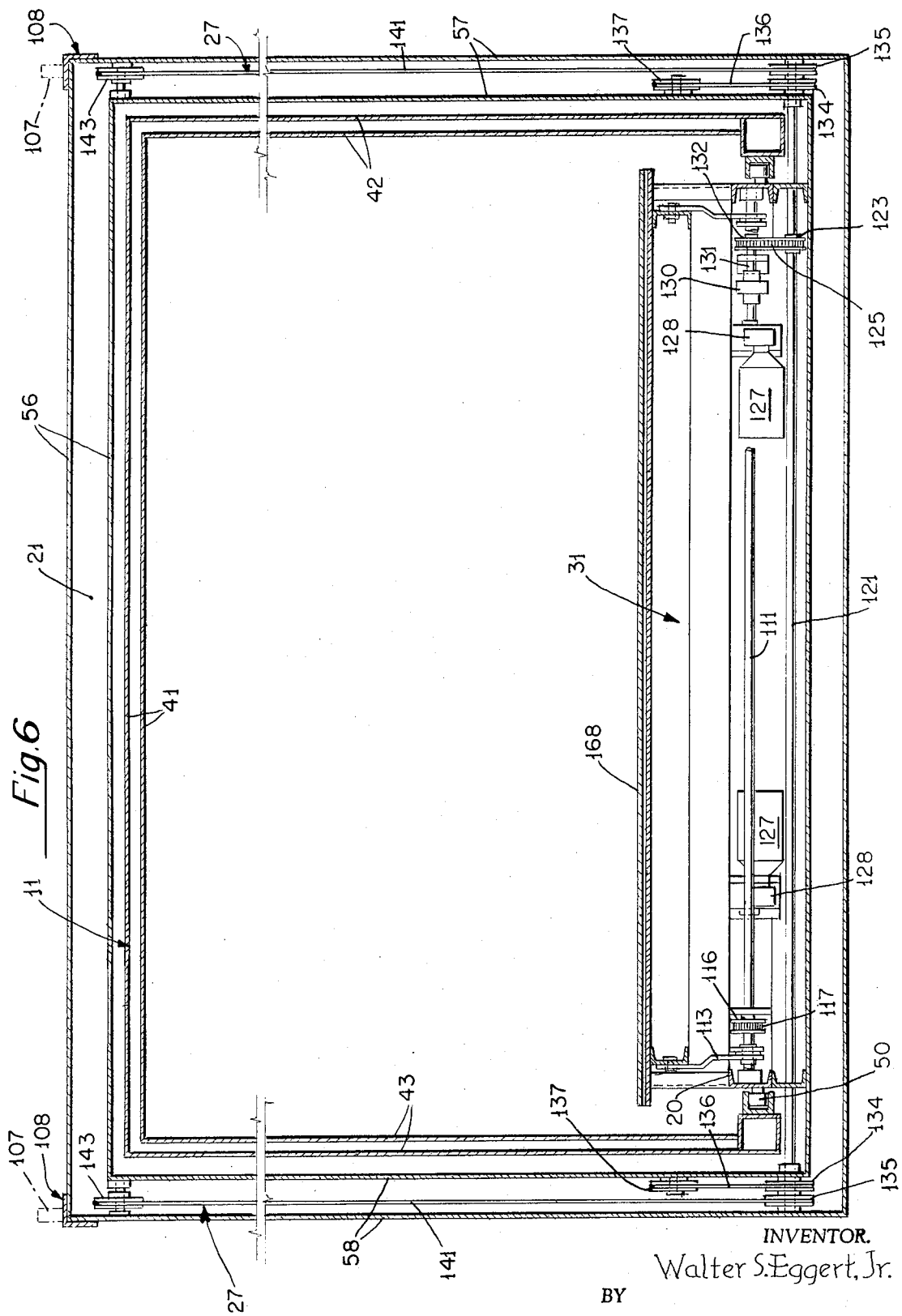
FIG. 6 is a sectional view taken along the lines 6—6 of FIG. 2 and showing the endwise telescopic relationship of the attachment frame means relative to the movable carriage canopy supporting frame means.

In operation the aircraft P is brought into alignment with the closure apparatus using existing ground handling equipment. The carriage means 19 of the closure apparatus is then extended from its retracted position shown in FIG. 4 to its extended position shown in FIG. 5, by means of suitable carriage drive means 193 connected between the carriage and the walkway structure 13. In the extended position of the carriage means 19 as indicated in FIG. 5 and prior to extension of the canopy means 23 on the carriage, the flexible interface of the canopy apparatus is approximately 6 inches from the aircraft. Thereafter the cables 136, 141 of the restraining means 27 are sufficiently extended or payed out to provide complete slack in the cables. The slack so provided enables both the drive means 25 via bellcrank 102 spring 103 for the upper canopy means 65, and the resilient drive means 39 via links 37 for the forward ramp means 35 to move into contact with the skin surface of the fuselage of the aircraft. Prior to opening the door D of the aircraft, the elevation of the forward ramp means 35 of the ramp means 31 is matched with the threshold level of the aircraft door. For this purpose the reversible ramp drive means 33 may be suitably activated in the proper direction to either raise or lower the forward ramp means. With the slack provided in the cables and the ramp at the proper elevation, the canopy apparatus 23 will follow in and out excursions of the aircraft due to wind or shifting of position. Up and down movement of parked aircraft relative to the canopy apparatus is sensed by the sensing apparatus previously referred to in sensing apparatus 119.

Upon the canopy apparatus being properly mated with the parked aircraft, the door D of the aircraft is then folded within the confines of the canopy structure. The door D, as seen in FIG. 8 overlays the treadle mechanism 169. In case of a power failure or a sudden lowering of the position of the aircraft due to failure of its tires or suspension system, the door will actuate the treadle 170 in a manner to disengage clutch 183, 184, 185 of the drive mechanism 127 to permit the sudden lowering of ramp 31.

What is claimed is:

1. A closure apparatus for a walkway having a floor and sidewalls for mating engagement with the marginal surfaces of a doorway of a parked aircraft, including:
   a. an attachment frame of generally rectangular configuration adapted to be fixedly positioned at one end thereof to a walkway,
   b. a sliding carriage frame positioned at the lower part of said attachment frame, said carriage frame including a horizontally pivoted ramp having a forward end adapted to engage a portion of the side of a parked aircraft,
   c. a rectangular frame slidably positioned on said attachment frame and being secured to a part of said carriage frame,
   d. a canopy in the general from of a rectangular hood slidably mounted on and supported by said rectangular frame, the forwardmost peripheral portions of the canopy adapted to engage the periphery of an opening in the side of a parked aircraft,
   e. first motor drive means for moving said canopy towards and away from said rectangular frame.

2. The closure apparatus of claim 1 wherein the said forward end of the said ramp is movable rearwardly and forwardly.

3. The closure apparatus of claim 1 including:
   a. second motor drive means for causing said pivoted ramp to execute angular motion about its pivot axis, to thereby compensate for any changes in height of an aircraft during loading or unloading.

4. The closure apparatus of claim 1 wherein said sliding carriage frame is slidably supported by said attachment frame.

5. The closure apparatus of claim 1 wherein the sides of the forward end of said canopy are defined by flexible members, adapted to conform to the sides of an aircraft.

6. The closure apparatus of claim 3 including means for sensing vertical motion of an object, such as a parked aircraft, relative to the closure apparatus.

7. The closure apparatus of claim 1 wherein said canopy is normally biased away from said rectangular frame and is restrained by said first motor drive means.

8. The closure apparatus of claim 2 wherein the forward end of said ramp is normally biased forwardly and is restrained by said first motor drive means.

9. The closure apparatus of claim 3 including:
   a. fail-safe means carried by said ramp, said fail-safe means adapted to be actuated by a door of an aircraft suddenly moving downwardly, said fail-safe means coupled to said second motor drive means, to thereby cause the ramp to pivot downwardly when the fail-safe means is actuated.

* * * * *